United States Patent [19]

Butler

[11] Patent Number: 5,491,964
[45] Date of Patent: Feb. 20, 1996

[54] ADJUSTABLE MULCH PLATE

[76] Inventor: Walt R. Butler, 18901 SW. 63rd St., Ft. Lauderdale, Fla. 33332

[21] Appl. No.: 268,207

[22] Filed: Jun. 29, 1994

Related U.S. Application Data

[63] Continuation-in-part of Ser. No. 47,802, Apr. 15, 1993, Pat. No. 5,337,545.

[51] Int. Cl.$^6$ .................................................. A01D 35/00
[52] U.S. Cl. ............................................................. 56/320.2
[58] Field of Search ............................... 56/320.1, 320.2, 56/202, 16.4, 16.6

[56] References Cited

U.S. PATENT DOCUMENTS

| | | | |
|---|---|---|---|
| 3,646,739 | 3/1972 | Dahl | 56/320.1 |
| 3,750,378 | 8/1973 | Thorud et al. | 56/10.5 |
| 3,884,020 | 5/1975 | Dahl et al. | 56/320.2 |
| 4,041,682 | 8/1977 | Kidd | 56/320.2 |
| 4,134,249 | 1/1979 | Wuerker et al. | 56/255 |
| 4,189,904 | 2/1980 | Paker | 56/255 |
| 4,258,539 | 3/1981 | Pearce et al. | 56/320.2 |
| 4,726,178 | 2/1988 | Mallaney et al. | 56/202 |
| 4,864,808 | 9/1989 | Weber | 56/320.2 |
| 4,890,446 | 1/1990 | Israel | 56/17.5 |
| 5,003,757 | 4/1991 | Hill | 56/17.4 |
| 5,048,279 | 9/1991 | Badawey et al. | 56/320.2 |
| 5,090,183 | 2/1992 | Thorud et al. | 56/2 |
| 5,117,616 | 6/1992 | McLean | 86/17.5 |
| 5,123,235 | 6/1992 | Fassauer | 56/12.9 |
| 5,179,823 | 1/1993 | Pace | 56/16.9 |
| 5,195,311 | 3/1993 | Holland | 56/320.2 |

OTHER PUBLICATIONS

Turf South, Sep. 1992—p. 39—"Dixie Choper".
Lawn & Landscape Maintenance, Dec. 1992—p. 66 & 67 John Deere advertisement.
Pro, Nov./Dec.— p. 4—"Mulching Technology. Is it ready for commercial applications?"
Lawn & Landscape Maintenance. Dec. 1992—p. 29 "Forgotten Costs".
Yard & Garden, Jul. 1992—p. 58—"Rotary Mulching Blade Kit".
Yard & Garden, Jul. 1992—p. 20—"Steiner Mulching Mower".
Yard & Garden, Jul. 1992—p. 22—"Lawn–Boy Power Mulch Kit".
Southern Turf Management, Jan. 1993—p. 39, "Mulching".
Yard & Garden, Sep. 1992—p. 34, "Eaglestar Mulcher Convertible Mower".
Pro, Sep./Oct. 1992—p. 30—"Super Nenja 2 x 2 Split Level Mulching Blade".
Yard & Garden, Jul. 1992—p. 63—"Mulching Blade Kits".
Yard & Garden, Jul. 1992—p. 7 & 8—the Ariens advertisement White Mulching Series, Husqvarna Mulching Power, Ariens Swivel System.
Yard & Garden, Jul. 1992—p. 81—"Houder Harmoney Mulching Mower".
Yard & Garden, Oct. 1992—p. 15 & 16—"Kubota Mulching Husqvarna Mulching Mower".
Yard & Garden, Apr./May 1993—p. 13—"Yazoo—Vari–Mulch" advertisement and specifications.

*Primary Examiner*—Michael Powell Buiz
*Attorney, Agent, or Firm*—Malin, Haley, DiMaggio & Crosby

[57] ABSTRACT

A mulch plate positioned over the chute outlet of conventional mowers so that the clippings are drawn back under the mower by the circulation of air induced by covering the mower chute with the adjustable mulch plate. The clippings are recirculated until they are sufficiently small in size, at which point they are released as mulch. An adjustable mulch plate is also contemplated so that the mulch plate can be raised or lowered to increase or decrease the entrained volume between the mulch plate and the chute outlet. Because the mulch plate is adjustable, mulching can be performed on any length or height of grass (even wet grass) and for hedge trimmings and leaves. An air baffle is also provided for preventing debris from escaping between the mulch plate and the chute outlet.

61 Claims, 7 Drawing Sheets

ADJUSTABLE MULCH PLATE

This application is a continuation-in-part of U.S. application Ser. No. 08/047,802 filed Apr. 15, 1993 now U.S. Pat. No. 5,337,545.

BACKGROUND OF THE INVENTION

1. Field of the Invention

This invention relates generally to a mulching arrangement, and, in particular, to an adjustable mulch plate attachment for lawn mowers which can be used with any length or height of grass (even wet grass) and for hedge trimmings and leaves. The mulch plate recirculates grass clippings under the lawn mower until fine particles of mulch are deposited onto the lawn.

2. Description of the Prior Art

Mulching allows for maintaining an even soil temperature, controlling weeds and enriching soil, whereby a mixture of organic material (such as straw, peat moss or leaves) is spread over a landscape. When grass clippings from a lawn mower are sufficiently reduced in size to small particles, they may serve as a mulching agent. Conventional mowers, however, are incapable of refining grass clippings to a sufficiently small size. The typical lawn mower propels a rotary blade to cut grass into clippings and either deposits those clippings onto the lawn or directs them into a catcher. Clippings discarded on a lawn take weeks to decompose and can turn to a thatch and smother the soil rather than fertilizing it, unless the clippings are raked and removed. Catchers are undesirable since mowing must be interrupted frequently to empty the contents of the catcher. In either event, the wasted time could be better spent cutting additional grass.

Alternatively, mulching lawn mowers reduce expenses, increase crew efficiency and decrease waste. Mulching lawn mowers are designed to cut grass clippings into tiny particles that decompose quickly once returned to the lawn, providing nourishment and moisture to the underlying soil. In theory, mowing time can be cut, fertilizer, trash bag and water expenses reduced, and productivity enhanced. Unfortunately, mulching lawn mowers used today are only useful under special conditions and require frequent maintenance. For example, mulching mowers normally require short, dry grass, flat landscapes and frequently honed blades. These mowers also leave uncut strips that necessitate recutting, especially on lawns having a high moisture content, tall grass or hills. In addition, moist grass that is cut has a tendency to stick to the underside of the conventional mulching mower, reducing the mulching capability and eventually dropping clumps of grass on the lawn.

Conventional mulching mowers suffer from the foregoing shortcomings or they are too complex to operate reliably. For example, U.S. Pat. No. 5,117,616 to McLane discloses a mulching lawn mower that deposits clippings in front of the mower for recirculation. McLane's mower comprises a deck which covers a rotating blade and a curved deflector which lies adjacent an opening provided in the deck between the front wheels. The deflector redirects air and grass exiting the opening downward in front of the mower. The positioning of the opening and deflector at the front of the deck allows the mower to run over grass clippings a second time, but if the grass is too wet, the opening clogs and suction under the deck becomes insufficient to lift the wet clippings off the lawn and into the cutting area.

An air-floated mulch recycle system, issued to Fassauer in U.S. Pat. No. 5,123,235, employs an air-floated housing having a rotatable cutting blade, an open bottom, an air intake opening conduit and a rear discharge port. A mulch recycling system comprised of a conduit attaches to the discharge port to receive grass clippings produced by the mower for delivery to the front of the mower for recutting. An air impeller means pressurizes air to float the mower, but inhibits the mower's ability to draw grass clippings into the mulch recycling system. Moreover, dry grass is preferred for cutting since wet clippings are difficult to lift into the blade, stick to the underside of the housing and clog the tubular chute used in the mulching system.

Another mulching device is disclosed in U.S. Pat. No. 5,048,279 issued to Badawey, and is utilized as a leaf mulcher for use with a rotary blade lawn mower. The leaf mulcher comprises a rotary blade lawn mower, a grass outlet and a screen mounted on the mower over the outlet. The screen provides a cutting edge for leaves dispersed from the outlet of the mower but does not facilitate the mulching of grass clippings, is easily clogged and is ineffective on damp lawns.

While the aforementioned background art discloses various designs for mulching debris from a rotary lawn mower, there is no disclosure of a low profile design that is adaptable to most mowers and capable of reducing clippings of various types (e.g., high grass or wet grass), and under diverse conditions, to a mulch for discarding as a nutrient into lawns. There is, therefore, a need for a mulching lawn mower that is able to reduce clippings from tall and wet lawns into fine particles for depositing the particles back into the lawns as a fertilizing nutrient. This invention is intended to solve these problems which are not adequately resolved by the background art.

SUMMARY OF THE INVENTION

The present invention includes a mulching arrangement comprising an adjustable mulch cover or plate which adaptably attaches to the chute of conventional lawn mowers to facilitate the refinement of grass clippings into tiny particles for dispersal into lawns as a fertilizing agent. The typical lawn mower with which this invention is best suited comprises a housing having a deck with an integrally formed peripheral skirt, a chute or outlet located on the front, rear or side of the mower adjacent, and usually defined by, the skirt, a motor supported by the housing, and rotatable blades that depend from the underside of the deck. The rotating blades are preferably high-lift blades with aerodynamic features that enhance the creation of a low pressure above the cutting blades which lifts grass into the blades for cutting.

In one embodiment, the outlet of the mower is shielded by a mulch cover or plate. The mulch cover is comprised of a front plate connected to an upper support flange, a lower lip, and partial end walls, all of which depend inwardly toward the mower deck. The upper support flange is provided with support brackets that pivotally connect to the lawn mower, allowing the mulch cover to be lifted for inspection of the blade area or for cutting in confined spaces. In addition, one or both of the support brackets is pivotally connected to a mulch plate angle adjustment support on the lawn mower which allows the mulch plate to be secured in a variety of positions with respect to the lawn mower chute. Each angle corresponds to a different mulching or entrained volume for accommodating different grass conditions, e.g., long grass, wet grass, etc. By "entrained volume" is meant the space under and adjacent to the mower deck through which the clippings pass during cutting, mulching, and expulsion from the mower. If the mulch plate begins to clog, the operator simply raises the mulch plate to the next higher setting, until the grass is mulched satisfactorily. The lower lip prevents matter from being thrown past the mulch plate when the plate is rotated beyond a lowermost position. In addition, an air flow baffle may be used with the adjustable mulch plate if the plate is adjusted to be used at large angles and entrained volumes, so as to protect the operator from being struck by debris exiting between the mower chute and the mulch plate and to reduce the accumulation of debris on the top surface of the mower.

The upper flange of the mulch cover may be connected to the front plate in such a way that it is positioned at an angle relative to horizontal to facilitate adjustment of the mulch plate relative to the deck through a variety of positions, each of which alters the dimensions of the entrained volume to correspond to lawn conditions and to foster the recirculation of clippings and other mulchable material. The lower lip of the mulch plate prevents clippings ejected through the chute and received by the cover from prematurely dropping into the grass due to gravity before they are sucked back below the blades for recurring. The lower lip also completes the partial enclosure over the chute or outlet to create a channel for the circulation of air to control the flow of grass clippings within the entrained volume. The front end wall of the mulch plate depends from the upper flange along the front of the mulch plate, leaving a space ("front opening") between the bottom edge of the end walls and the lower lip on each side. A space is also defined by the rear end wall and lip ("rear opening"). These spaces provide a front opening and a rear opening for permitting air and debris to escape from the entrained volume to achieve the right pressure balances inside the entrained volume. It is believed that clippings that are mulched to a sufficiently reduced size are expelled out of the front opening in the cover, while larger clippings are pulled back into the entrained volume by the air flow created by the rotating blades, and in particular by the reduced pressure above the rotating blades. A hinged safety flap may be employed to cover all or a portion of the rear opening to maintain proper air circulation and to prevent clippings not yet satisfactorily mulched within the entrained volume from escaping while releasing heavier debris that would otherwise clog the mulching chamber. hinged safety flap is biased in a closed position by gravity or any other biasing element.

Unlike the background art, the present invention forms a variable volume pressurized chamber and a unique air ventilation system by partially shielding the outlet of the chute with the mulch cover. When the mower blades are rotated, a flow of air is created due to low pressure above the blades such that grass is drawn upward with the air flow into the rotating blades, ejected out the chute, and redirected by the mulch cover back into the housing for recirculation. The mulching arrangement utilizes pressure gradients created under the deck to accelerate air so that grass clippings expelled by the centrifugal and air pressure forces of the rotating blades are blocked from exiting the chute beyond the mulch plate and consequently are pulled back into the cutting volume below the mower deck. During operation, a lower pressure is produced above the rotating blades than below the blades, creating a suction that lifts grass and clippings into the blades. The centrifugal force created by the rotating blades forces the clippings outwardly through the chute where they engage the mulch cover. The adjustable mulch cover constrains the clippings until the air flow created by the blade rotation lifts and carries the clippings into the blades.

It is an object of the invention to provide a device for attachment to lawn mowers which causes mower clippings to recirculate under the lawn mower until fine particles of mulch are produced for dispersal into lawns as a fertilizing agent.

An additional object of the instant invention is to provide a mulching arrangement comprised of a cover that shields a lawn mower chute while providing a unique air venting system to create an air circulation pattern that continuously recycles mower clippings under the housing.

A further object of the instant invention is to provide a mulching arrangement for use with conventional lawn mowers that reduces grass clippings into tiny particles so that raking and bagging are no longer necessary, thereby saving time and money.

Another object of the instant invention is to provide a mulching arrangement that pivotally connects to a lawn mower so that complete removal of the mulch plate is unnecessary when mulching is not to be performed.

Another object is to provide an adjustable mulch plate that can be secured to a mower at different angular orientations to create different entrained volumes for mulching any length or height of grass (even wet grass) and for hedge trimmings and leaves.

A further object of the instant invention is to provide a mulching arrangement that is simple in design and construction.

Still another object is to provide a mulching arrangement for use with various lawn mowers that is capable of reducing leaves and other lawn debris into fine particles of mulch.

Yet another object of the invention is to provide a mulching arrangement that is useful and effective in wet and tall grass, and on uneven terrain.

Another object of the invention is to provide an adjustable mulching arrangement that protects the operator from debris exhausted from the mulch plate when the mulch plate is raised to create a large entrained volume for cutting tall grass or wet grass.

Still another object of the invention is to provide an adjustable mulching arrangement that prevents an accumulation of debris on the deck of the mower when the mulch plate is raised.

In accordance with these and other objects which will become apparent hereinafter, the instant invention will now be described with particular reference to the accompanying drawings.

DESCRIPTION OF THE PREFERRED EMBODIMENTS

With reference to the drawings, FIGS. 1–9 depict a mulching arrangement generally characterized by the reference numeral 10, comprising a mulch plate or cover 11 connected to a conventional lawn mower 12. The lawn mower 12 is comprised of a housing 13 having a deck 14 integrally combined with a depending skirt 16 around its peripheral edge, a motor 18 attached to the upper side of deck 14, a plurality of rotatable blades 20 suspended from the underside of the deck 14 and a discharge chute or outlet 22 defined by a portion of the skirt 16 in the side of the housing 13. The lawn mower is supported by front wheels 15 and rear wheels 17 which allow the lawn mower to be transported easily over the ground. The rotatable blades 20 which depend from the deck 14 are typically aerodynamic or high-lift in design, such that when driven by the motor 18, grass is lifted for cutting and simultaneously propelled outward towards the chute 22. Grass clippings, along with other shredded debris, are prevented from immediately leaving the chute 22 by the mulch cover 11, which is attached to the deck 14 adjacent the chute 22.

The essence of the present invention is found in the mulch cover 11, which provides a means for blocking the expelled mower clippings such that the clippings are recycled back into the cutting chamber 21 defined by the mower deck 14. The mulch cover 11 is comprised of a side wall or plate 24 formed with an upper support flange 26, a lower lip 28, a rear end wall 30, and a front end wall 32, all of which generally enclose the chute 22. The mulch cover 11 attaches to the deck 14 between front wheel 15 and rear wheel 17, wherein the side wall 24 is disposed in a generally vertical plane normal to the path of exiting clippings to block and contain same when the mulch cover 11 is in the position shown in FIGS. 1, 4, 5, and 6. The upper support flange 26 acts as an upper wall or ceiling and preferably forms an obtuse angle with side wall 24 along its upper edge. The rear end wall 30 and the front end wall 32 depend downwardly from opposite sides of the upper support flange 26 and, preferably, but not by limitation, normal to the end wall 24 to provide partial side enclosure walls. Moreover, the heights of the rear end wall and the front end wall are preferably less than that of the side wall 24 so as to create front and rear vents or air escape openings. A lower lip 28 is connected to and protrudes inwardly from side wall 24. The lower lip 28 in the preferred embodiment forms a right angle with the end wall 24, but may be otherwise and still fall within the scope of the instant invention. A front opening 36 is defined by the area between the bottom edge of front end wall 32 and lower lip 28, while a rear opening is defined by the area between rear end wall 30 and lower lip 28. A hinged flap 38 may be attached to the lower edge of rear end wall 30 to cover the rear opening.

The attachment of mulch cover 11 to the housing 13 is facilitated by support brackets 40 which protrude from the upper surface of upper support flange 26. The support brackets 40 pivotally mate with corresponding support members 42 that protrude from the housing in proximity of the chute 22. Alternatively, the mulch cover 11 may be fixedly secured to the housing 13. When aligned, apertures 41 and 43, found in support brackets 42 and corresponding apertures 41', 43' defined by support member 42, respectively, facilitate the connection of same. A crossbar 44 protrudes vertically from the upper side of the deck 14 along the upper edge of chute 22, adjacent members 42. Upon attachment, the free edge of upper flange 26 rests on the upper edge of the crossbar 44, and air vents 46, 48 are formed at the end walls 30, 32 and between the top edge of the crossbar 44 and the mulch cover 11. The air vents 46, 48 allow air to escape from the pressurized chamber 50 formed by the cover 11 and chute 22.

The structure and arrangement of the instant invention is unique in that an entrained volume or chamber 50 employing a novel pressure gradient maintenance arrangement is formed on a side of the mower by placing mulch plate 10 adjacent the chute 22. A pressure gradient and, it is believed, a vortex of air are produced under the housing and in the volume 50 when the blades are rotated, such that grass is pulled upward into the rotating blades 20 where it is cut and ejected toward and out of the chute 22, into the volume 50, constrained momentarily there and then sucked into the cutting volume below the blades for recutting until the desired reduction in size, in mulching, has been accomplished.

Figure 1:
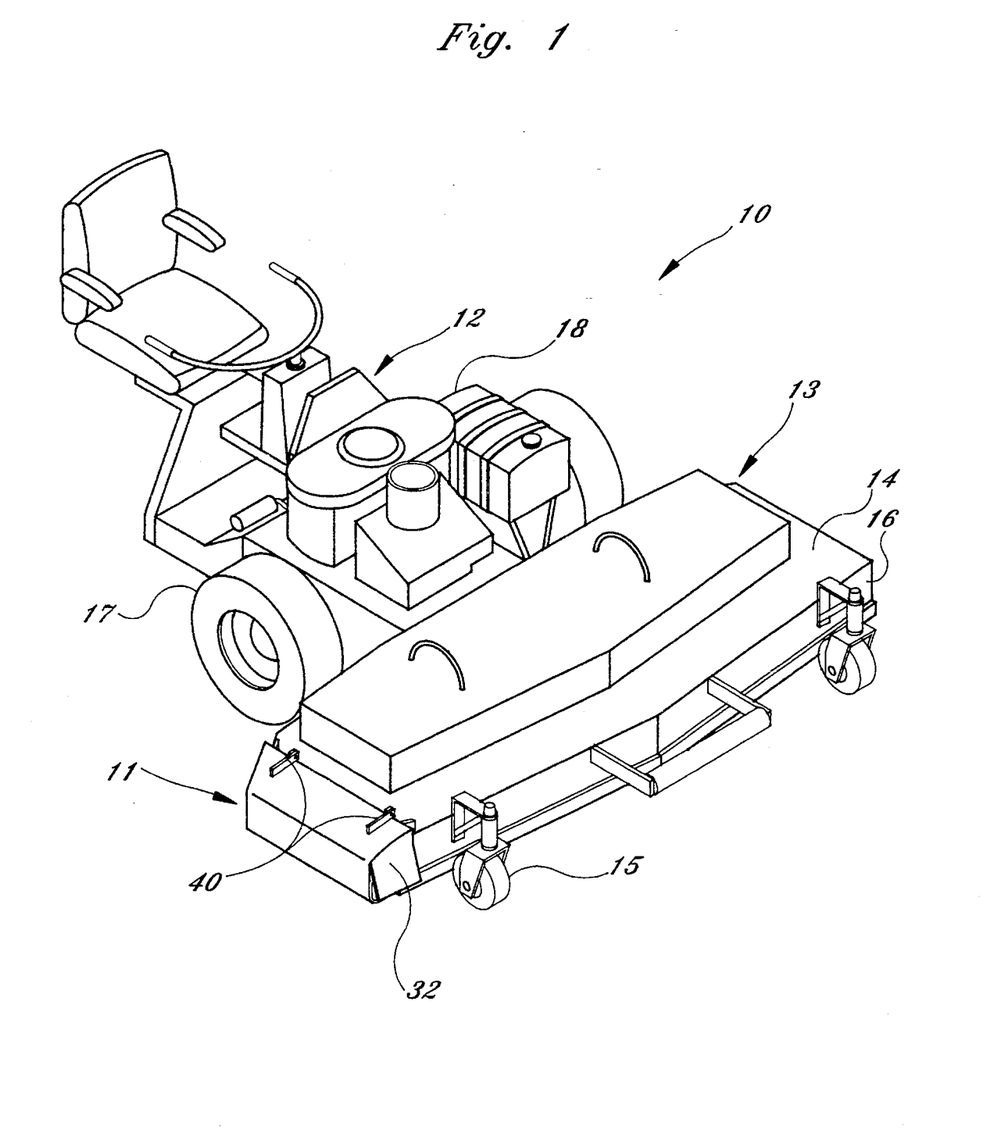
FIG. 1 is a perspective view of the mulch plate of the instant invention attached to a convention lawn mower.
Figure 2:
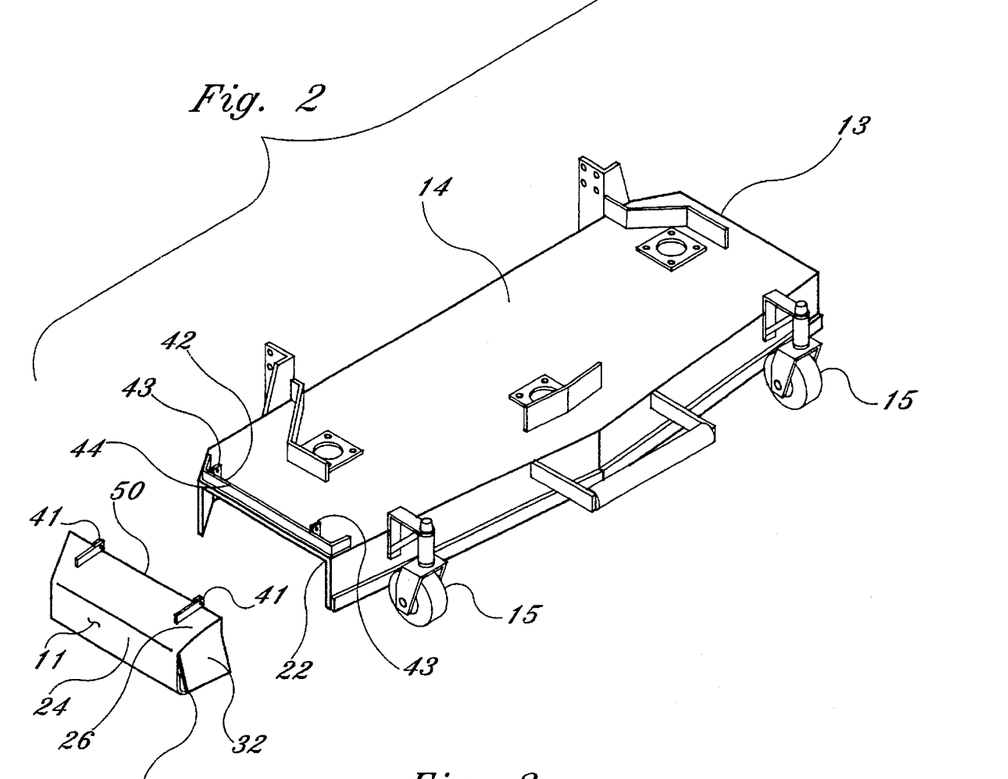
FIG. 2 is an exploded view of the mulch plate and the lawn mower housing.
Figure 3:
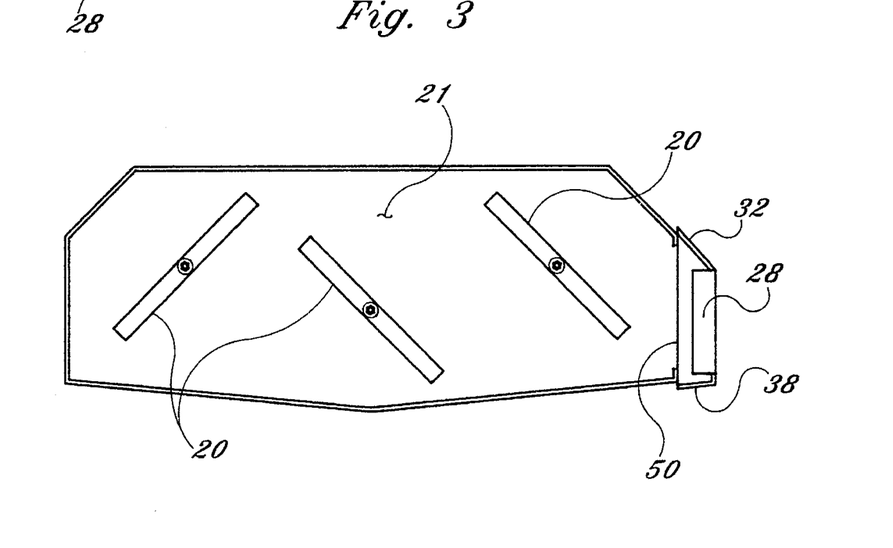
FIG. 3 is a bottom view of the mulch plate and lawn mower housing.
Figure 4:
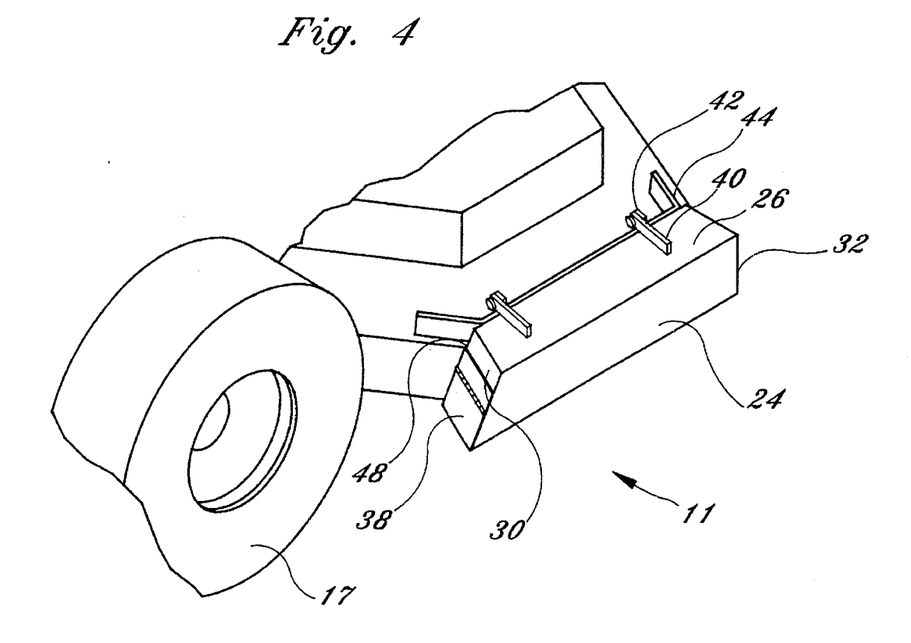
FIG. 4 is a partial perspective view of the mulch plate attached to a mower deck showing a hinged flap in its normally closed position.
Figure 5:
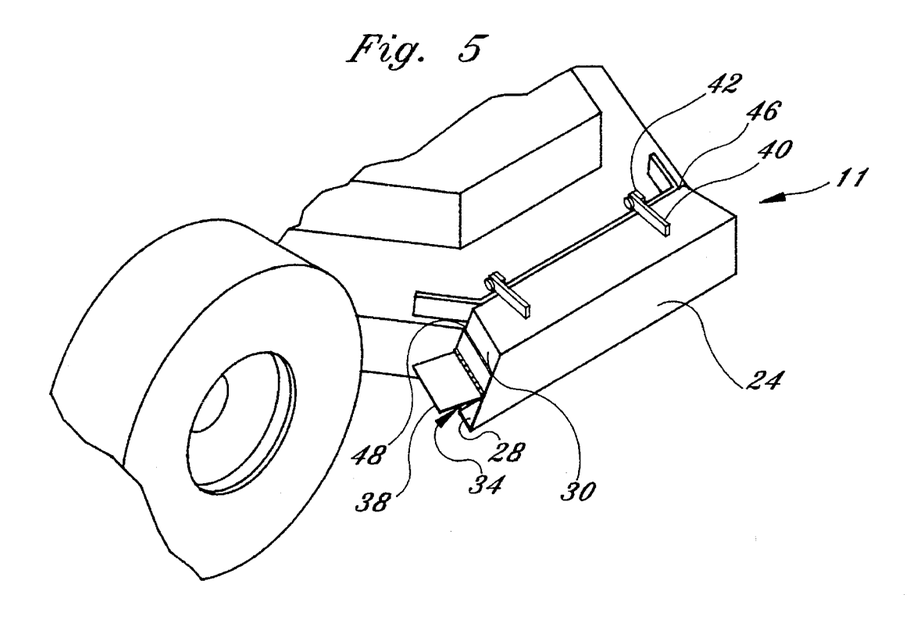
FIG. 5 is a partial perspective view of the mulch plate attached to the mower deck showing the hinged flap in an open position.
Figure 6:
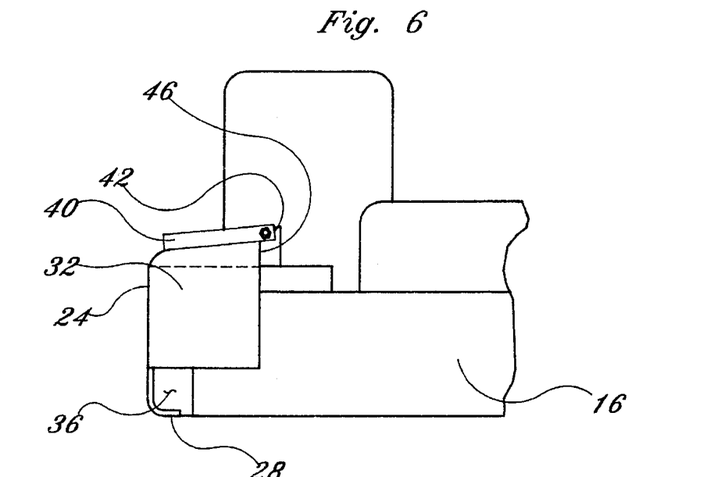
FIG. 6 is a front end view of the mulch plate attached to the mower deck.
Figure 7:
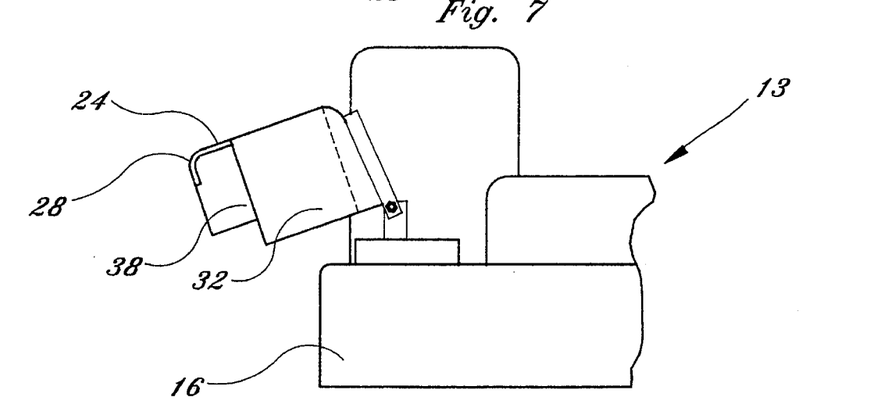
FIG. 7 is a front end view of the mulch plate rotated relative to the mower deck.
Figure 8:
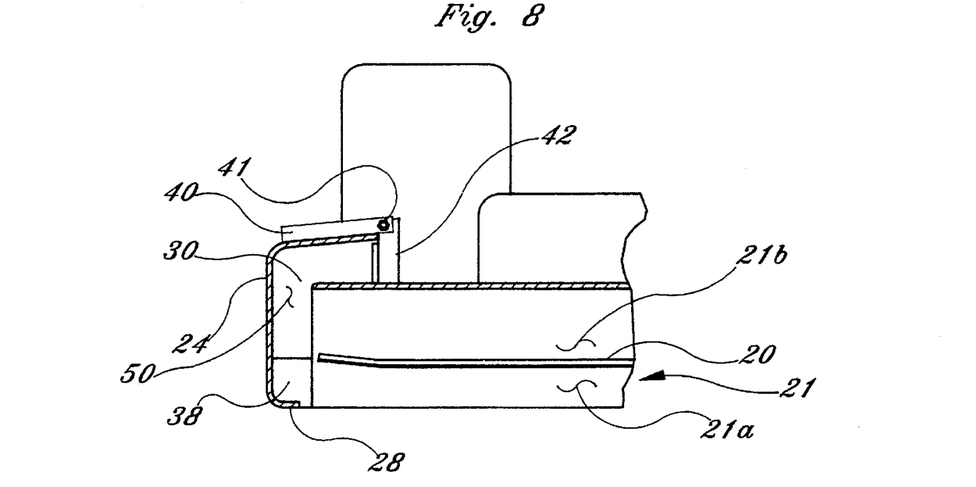
FIG. 8 is a front cross sectional view of the mulch plate and lawn mower housing.
Figure 9:
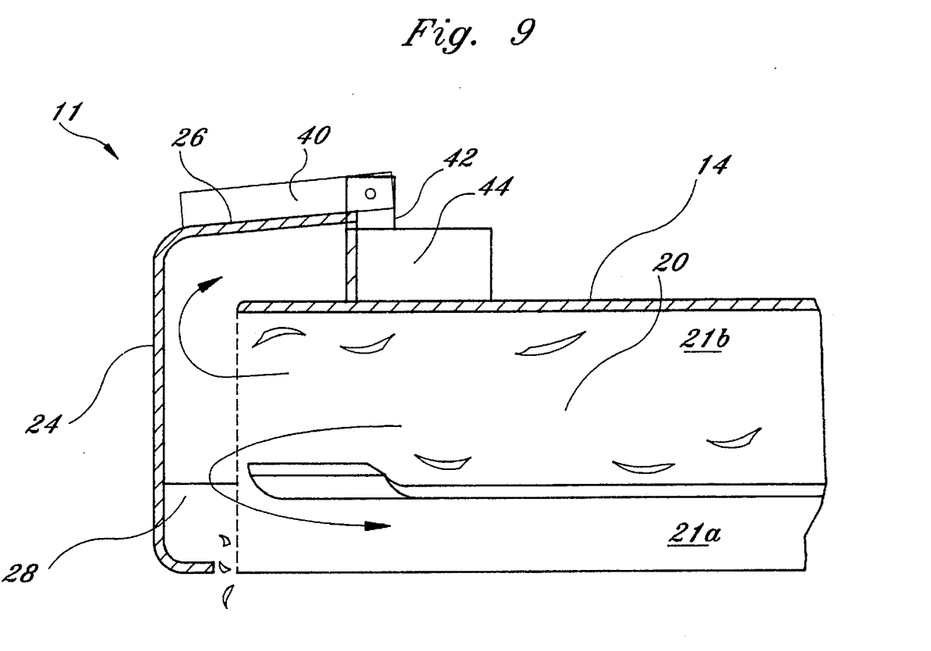
FIG. 9 is a front cross sectional view of the mulch plate in operation.

Referring to FIGS. 8 and 9, the rotation of the high-lift blades 20 creates a higher pressure above the blades than below the blades, such that grass is lifted upward into the cutting edge and clippings are ejected outward by the centrifugal force of the blades through the chute 22 into the volume 50. When viewed from the front of the lawn mower, the air vortex V circulates in a clockwise direction, such that air is drawn upwardly over the blades out into the entrained volume 50 and back under the blades into the low pressure volume 21a. By placing a mulch cover 11 over the chute 22, pressure differentials are created and utilized to create an air vortex that circulates from under the housing into the volume 50 and back into the cutting volume. The mulching arrangement utilizes the pressure differentials created under the deck to accelerate air so that grass clippings C expelled by the centrifugal force of the rotating blades get pulled back into the cutting volume. Through experimentation, it has been observed that the clippings expelled from the post-cut volume 21b collect generally toward the front of the mulch cover 11 near the front end wall 32, while clippings C already sufficiently reduced are expelled out of volume 50. Larger clippings are pulled back into the cutting volume 21 by the air flow, as shown by the larger arrow in FIG. 9. Mulch cover 11 constrains the material at its rear 36 long enough for the air vortex created by the blade rotation to lift and carry the clippings from the volume 50 back the cutting volume 20. Clippings recirculated into the high pressure volume 21a are drawn to the cutting edge of the blades 20 via the suction created from the low pressure volume 21b above the blades. The lower lip 28, while providing the lower portion of mulch cover 11, prevents heavier clippings ejected from the cutting area 21 from prematurely dropping to the ground before being recirculated into the blades by the air vortex. The front opening 36 allows clippings that have been sufficiently refined to escape through that opening. Large debris, such as rocks or twigs, exit the housing 13 with enough force such that they displace hinged flap 38 and escape. Flap 38 may be positioned over the rear opening in a normally closed position such as that shown in the drawings. The air vents 46 and 48 act as pressure release orifi to maintain the proper pressure gradient in the volume 50 and cutting volume 20. Of course, the vent openings must be designed so that they are not too large. Otherwise, a vortical circulation of air would not occur and an acceptable pressure gradient would not be established. The rotation of the blades 20 is clockwise when viewed from the bottom so that the centrifugal force is directed toward the chute 22.

It should be noted that the present invention is useful for dry lawns as well as wet ones, where the unique air circulation system causes wet clippings to be rapidly shaken dry, reducing the tendency of clippings to stick to the underside of the housing 13. It should be further noted that this system is also capable of mulching leaves and small twigs that are commonly picked up by a lawn mower. The mulch cover also blocks larger matter discharged from the mower such that injuries are prevented. The venting system facilitated by vents 46, 48 meters the amount of air that circulates under the housing and in the volume 50. Too large an opening in the form of vents 46, 48 prevents the clippings C from being recirculated. Meanwhile, too small an opening in the form of vents 46, 48 dampens the air circulation pattern V.

Figure 10:
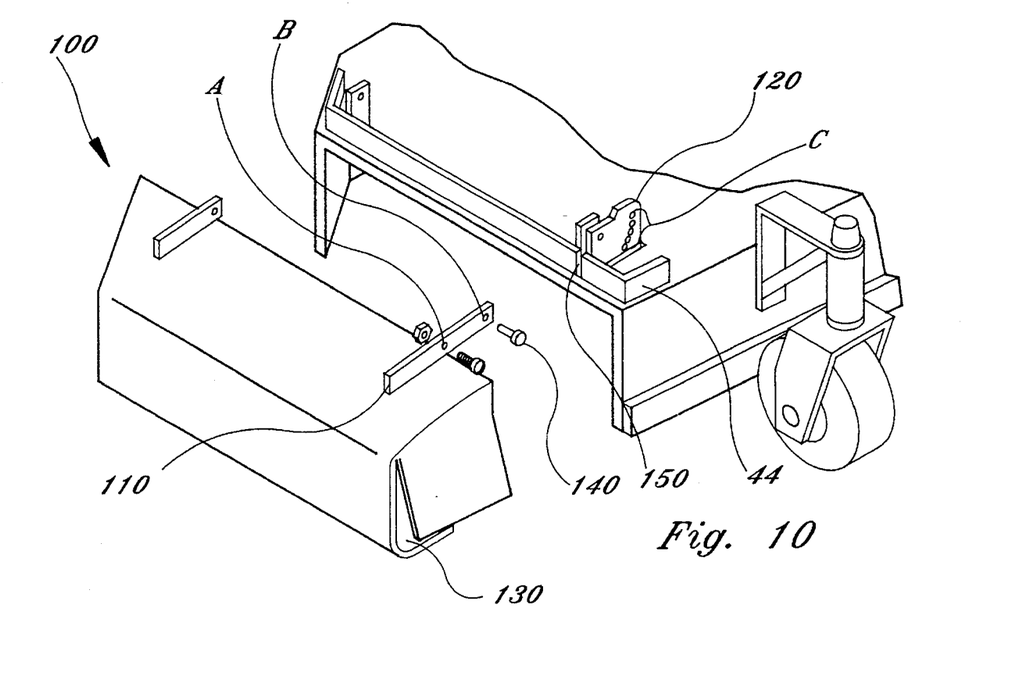
FIG. 10 is an exploded view of another embodiment of the invention and a conventional mower deck.

FIG. 10 shows another embodiment of the invention comprising an adjustable mulch plate 100 generally similar to the mulch plate 11 in FIGS. 1–9, but which may include an extended lower lip 130 and a longer support bracket 110 defining a first aperture and a second aperture, A and B, respectively, instead of one aperture 41' as in the previous embodiment. The support bracket 110 is pivotally connected to an angle adjustment support 120, which is secured to the deck 14 of the lawn mower, with any conventional connection such as a bolt and nut arrangement 107 inserted through aperture A and a corresponding aperture 109 provided in the angle adjustment support 120. The angle adjustment support 120 is also provided with a series of angle adjustment apertures C, each of which may be aligned with aperture B on support bracket 110 when the support bracket 110 is connected to the angle adjustment support 120. A pin 140 is placed through aperture B and one of the angle adjustment apertures C on the support 120. In this manner, the position of the mulch plate 100 and, accordingly, the size of the entrained volume chamber 50, can be adjusted depending on the type of mulching to be performed. For example, larger entrained volumes are necessary to maintain proper mulching for wet or tall grass. The mulch plate 100 can be secured in various different positions, and the operator has control over the size of the entrained volume and can easily modify the position of the mulch cover for a desired job by removing pin 140, adjusting the orientation of plate 100, and reinserting pin 140 through aperture B and a corresponding one of aperture C. A channel 150 is provided in the crossbar 44 so that the mulch plate 100 can be rotated into and beyond the position shown in FIG. 7. This is necessary since the end of the support bracket 110 adjacent the pin 140 rotates outwardly beyond the crossbar 44 when the mulch plate 100 is rotated over the mower such as when the mower is being transported or stored. Also, the mulch plate includes an extended (safety) lip 130 so that, when mulch plate 100 is raised, the plate 100 still tends to prevent debris from being projected from the chute and the mulch plate which could result in an injury to the operator or others in close proximity to the mower.

Figure 11:
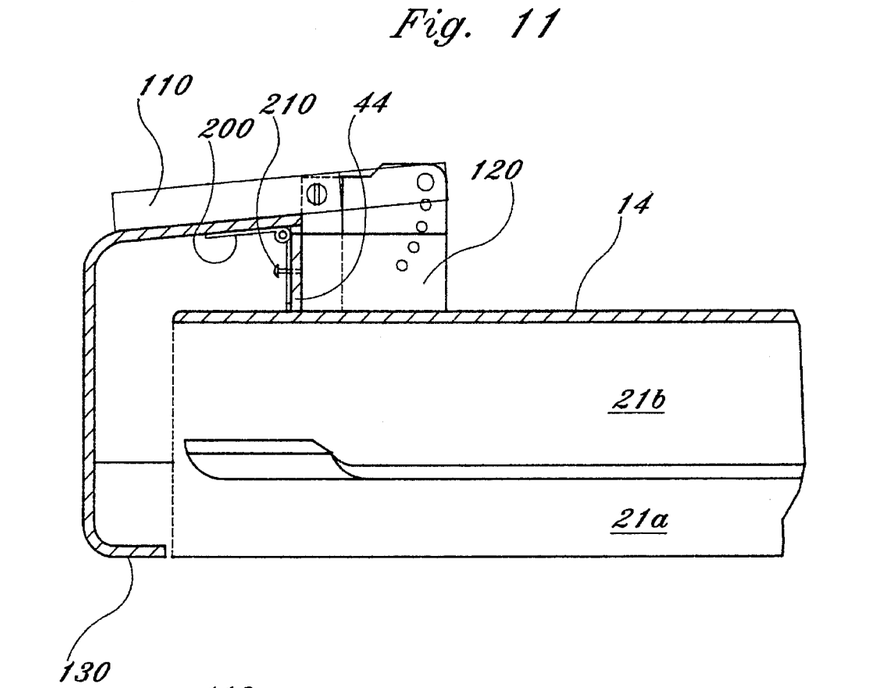
FIG. 11 is a cross sectional view of the adjustable mulch plate with an air restrictor according to another embodiment of the invention.
Figure 12:
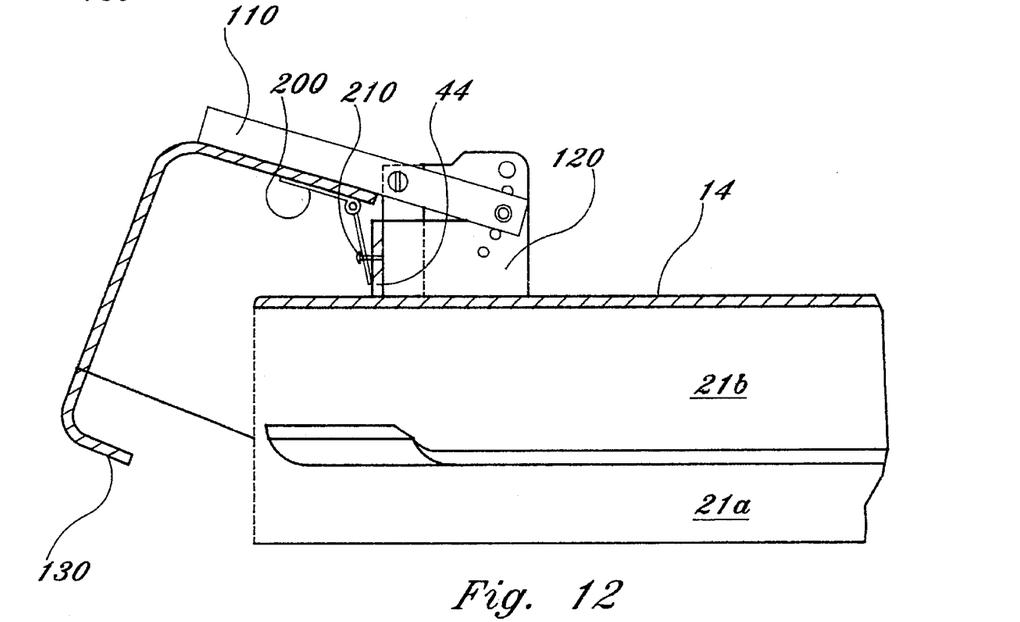
FIG. 12 is a cross sectional view of the adjustable mulch plate and air restrictor with the mulch plate in an intermediate position.
Figure 13:
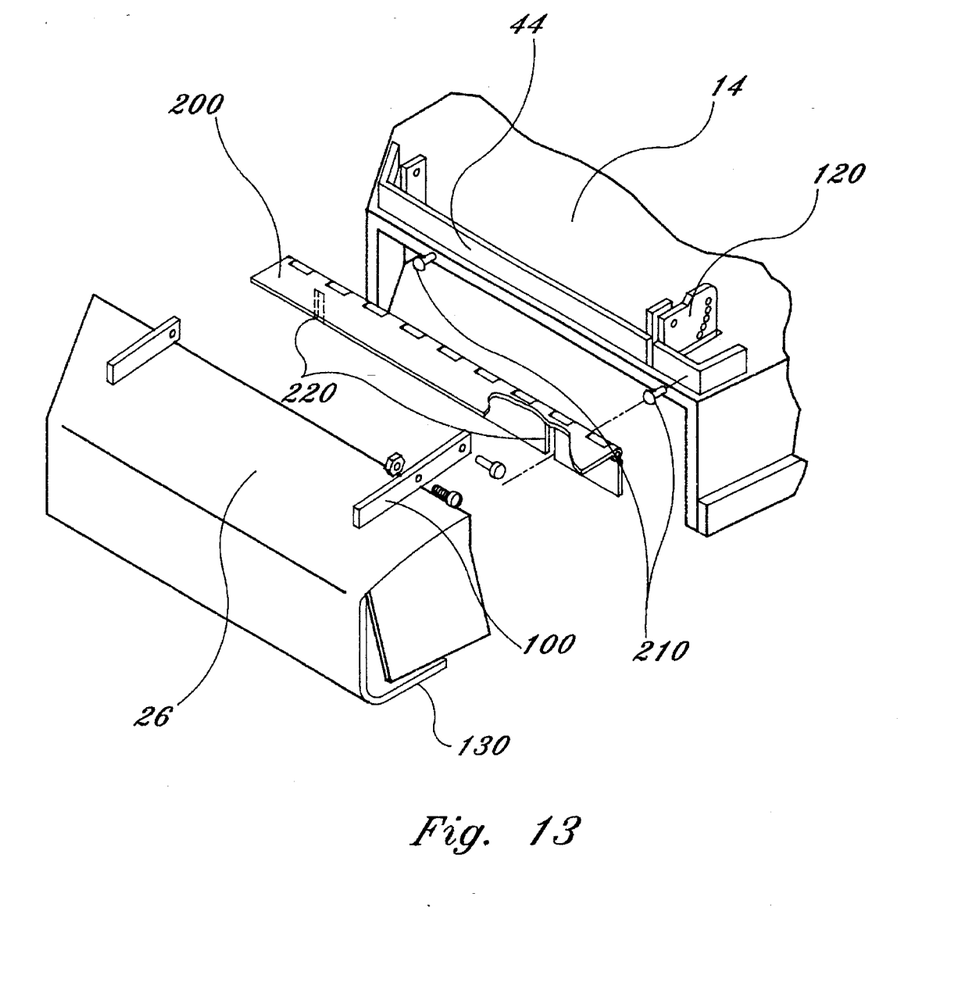
FIG. 13 is an exploded view of the adjustable mulch plate and air restrictor.

FIGS. 11–13 show yet another embodiment of the invention wherein the mulch plate 100 includes an air constrictor 200 for preventing debris from being expelled from between the upper flange 26 of the mulch plate 100 and the top edge of the crossbar 44. The air constrictor 200 may, for example, comprise a long hinge (e.g., a piano hinge), a first member 201 which is secured to the underside of the upper flange 26, and a second member 202 which defines slots 220 (see FIG. 13) which are slidably engaged with pins 210 secured to the outboard side of the crossbar 44 or the outboard edge of the deck 14 of the mower. When the mulch plate 100 is lifted, as shown in FIG. 12, the constrictor 200 is opened, and the lower half 202 is slidingly raised against the edge of the deck 14 and/or the crossbar 44 by virtue of the arrangement of pins 210 and slots 220. The constrictor 200 prevents debris from being projected out from between the chute and the mulch plate toward the operator (which can pose a particular danger where, for example, the mower is a riding type mower), as well as preventing debris from being deposited on the deck 14 of the mower. The mulch plate 100 and constrictor 200 may be made from metal, wood, plastic, rubber or almost any other material so long as it serves its intended purpose.

The instant invention has been shown and described herein in what are considered to be the most practical and preferred embodiments. It is recognized, however, that departures may be made therefrom within the scope of the invention and that obvious modifications will occur to those persons skilled in the art.

What is claimed is:

1. A mulch plate for use with a rotary lawn mower, said lawn mower having a deck and at least one rotating blade for cutting and a discharge chute for expulsion of mower clippings, said mulch plate comprising:

a plate oriented transversely over said discharge chute so as to be struck by mower clippings expelled through said discharge chute;

an upper wall connected to said plate and extending toward said deck so as to partially overlap said deck in spaced relation;

a lower lip connected to said plate and extending toward said discharge chute, ending in a plane below a plane formed by said at least one rotating blade;

means connecting said mulch plate to said deck; and front and rear wall means which partially enclose a space between said discharge chute and said plate.

2. The mulch plate of claim 1, further comprising means for venting air within said space to the ambient.

3. The mulch plate of claim 2, wherein said means for venting includes an air space defined by adjacent edges of said plate and said front wall means.

4. The mulch plate of claim 3, wherein said means for venting further includes an air space defined by adjacent edges of said plate and said rear wall means.

5. The mulch plate of claim 4, wherein said means for venting further comprises an air space defined by an edge of said upper wall and said deck.

6. The mulch plate of claim 1, wherein said means for connecting includes a means for permitting said mulch plate to pivot relative to said deck.

7. A mulch plate for use with a rotary lawn mower having a deck and at least one rotating blade therebelow and a skirt surrounding said deck and defining a discharge chute for the expulsion of mower clippings, said mulch plate comprising:

a partial enclosure means adapted to cover said discharge chute, said cover means being generally C-shaped in cross section and including a partial front wall means and a partial rear wall means;

said cover means being connected to said lawn mower; and a generally upstanding side wall of said cover means being disposed generally transversely to a plane defined by said at least one rotating blade.

8. The mulch plate of claim 7, wherein said cover means generally encloses a space defined by said discharge chute, said generally upstanding side wall, said front wall means, said rear wall means, and upper and lower wall means connected to said upstanding wall means.

9. The mulch plate of claim 8, wherein said cover means is pivotally connected to said lawn mower.

10. The mulch plate of claim 9, wherein said cover means is pivotally connected to said deck.

11. The mulch plate of claim 8, further comprising means for venting air from the space between said cover means and said discharge chute to the ambient.

12. The mulch plate of claim 11, wherein said means for venting includes an air space between said front wall and said side wall means.

13. The mulch plate of claim 12, wherein said means for venting further includes an air space between said rear wall means and said side wall.

14. The mulch plate of claim 13, wherein said means for venting further includes an air space between said upper wall means and said deck.

15. A mulch plate for use with a rotary lawn mower having a deck and at least one rotary blade for cutting and a discharge chute for expelling mower clippings, said mulch plate comprising:

a plate means having an upper edge, a lower edge, a front end, and a rear end, said plate spaced from and transversely across at least a portion of said discharge chute;

a flange which projects inwardly from said upper edge of said plate toward said lawn mower;

a lip which projects inwardly from said lower edge of said plate toward said lawn mower;

a rear end wall which depends downwardly from said flange adjacent to said rear end of said plate;

a front end wall which depends downwardly from said flange adjacent to said front end of said plate; and means for connecting said mulch plate to said lawn mower.

16. The mulch plate of claim 15, wherein said means for connecting said mulch plate to said lawn mower includes a means for permitting said mulch plate to pivot relative to said deck.

17. The mulch plate of claim 16, further comprising means for maintaining predetermined pressure gradients under the mower for inducing an air flow that draws expelled mower clippings blocked by said mulch plate back into the at least one rotary blade for recutting.

18. The mulch plate of claim 17, further comprising means for safely releasing large debris, e.g. stones, twig pieces, associated with said rear end wall.

19. A mulch plate for use with a rotary lawn mower having at least one rotating blade for cutting and a discharge chute for the expulsion of mower clippings, said mulch plate comprising:

a plate oriented over the chute outlet for blocking mower clippings exiting the chute outlet;

means for partially enclosing the discharge chute, said means for partially enclosing projecting inwardly from said plate toward said mower for preventing mower clippings from escaping the plate and the mower;

means for adjustably supporting said plate with respect to the discharge chute so as to allow said mulch plate to be oriented in a plurality of different positions corresponding to different entrained volumes for mulching and for retracting said plate for moving in confined spaces; and means controlling air circulation under the mower defined by said means for partially enclosing so that clippings prevented from escaping the plate are drawn back into the rotating blades for recutting by low pressure generated by said at least one rotating blade.

20. A mulch plate according to claim 19, wherein said mulch plate further includes means for releasing large debris.

21. The mulch plate according to claim 20, wherein said means for releasing comprises:

an end wall connected to said plate, said end wall defining an opening; and a resilient flap connected to said end wall to cover said opening, said flap being displaced when engaged with sufficient force from large debris expelled through said discharge chute.

22. A mulch plate according to claim 19, wherein said means for partially enclosing said discharge chute comprises:

a flange which projects inwardly from an upper edge of said plate toward said mower;

a lip which projects inwardly from a lower edge of said plate toward said mower;

a rear end wall which depends downwardly from said flange adjacent a rear end of said plate; and a front end wall which depends downwardly from said flange adjacent a front end of said plate.

23. A mulch plate according to claim 19, wherein said means for adjustably supporting said plate comprises support bracket means connected to said mulch plate and means for engaging said support bracket means in a variety of angular positions.

24. A mulch plate as recited in claim 23, wherein said support bracket means is at least one extended bracket defining a first aperture and a second aperture, and wherein said means for engaging defines a plurality of angle adjustment apertures, any one of which can be aligned selectively with said second aperture in said support bracket means to adjust the mulch plate in a given angular orientation relative to said discharge chute.

25. A mulch plate as recited in claim 24, further comprising a bolt and screw pivotally securing said first aperture and said rotation support aperture so that said mulch plate is pivotally attached to said mower, and further comprising a pin securing said second aperture and one of said plurality of corresponding angle adjustment apertures so that said mulch plate is positioned at an angle with respect to the chute outlet, each angle of said mulch plate corresponding to a different entrained volume between said mulch plate and the chute outlet.

26. A mulch plate according to claim 19, wherein said means for controlling air circulation under said mower comprises:

a flange projecting from the upper edge of said plate;

a lip which projects inwardly from the lower edge of said plate toward said mower;

a rear end wall which depends downwardly from said flange along the rear end of said plate, said rear end wall defining an opening; and a front end wall which depends downwardly from said flange along the front end of said plate, said front end wall defining an opening.

27. A mulch plate according to claim 19, wherein said mulch plate further comprises means for releasing large debris from said mulch plate, said means for releasing attached to said means for partially enclosing.

28. A mulch plate for use with a rotary lawn mower having rotary blades for cutting and a chute outlet for the expulsion of mower clippings, said mulch plate comprising:

a plate having an upper edge, a lower edge, a front end and a rear end for partially enclosing said chute outlet;

a flange which projects inwardly from said upper edge of said plate towards said mower;

an extended lip which projects inwardly from said lower edge of said plate towards said mower;

a rear end wall which depends downwardly from said flange along said rear end of said plate;

a front end wall which depends downwardly from said flange along said front end of said plate;

means for pivotally mounting said mulch plate to said mower over said chute outlet such that said mulch plate partially encloses said chute outlet for blocking the expulsion of mower clippings;

means for adjustably supporting said mulch plate over said chute outlet in a plurality of different positions in accordance with the type of mulching to be performed;

means for maintaining pressure gradients under the mower for inducing an air flow that pulls mower clippings blocked by said mulch plate back into the rotating blades for recutting;

means for releasing large debris from said mulch plate, said means for releasing attached to said rear end wall; and means for discarding mower clippings that have been sufficiently reduced in size to mulch, said means for discarding defined by said front end wall.

29. A mulch plate according to claim 28, wherein said means for maintaining pressure gradients comprises means for releasing excess air buildup.

30. A mulch plate according to claim 29, wherein said means for releasing excess air buildup is formed by a gap between said rear end wall and the chute outlet and another gap between said front end wall and the chute outlet.

31. A mulch plate according to claim 28, wherein said means for discarding mower clippings sufficiently reduced in size comprises an opening in said front end wall through which said clippings are ejected.

32. A mulch plate according to claim 28, wherein said means for releasing large debris comprises a resilient member attached to said rear end wall for releasing large debris when engaged with sufficient force from the large debris.

33. A mulch plate as recited in claim 28, wherein said means for adjustably supporting said mulch plate comprises an extended support bracket provided on said mulch plate and having a first aperture and a second aperture, and an angle adjustment support provided on the chute outlet and having a rotation support aperture which corresponds with said first aperture and a plurality of angle adjustment apertures which correspond with said second aperture as said mulch plate is pivoted about said first aperture with respect to the chute outlet.

34. A mulch plate as recited in claim 23, further comprising a bolt and nut inserted through said first aperture and said rotation support aperture to permit relative rotation between said mulch plate and the chute outlet and a pin inserted through said second aperture and one of said plurality of angle adjustment apertures to secure said mulch plate at various angles with respect to the chute outlet, each position of said mulch plate corresponding to a different entrained volume between said mulch plate and the chute outlet.

35. A mulch plate for a lawn mover having a chute outlet an one site of the lawn mower, said mulch plate comprising: means for covering the chute outlet; and means for connecting said means for covering to the lawn mower including a means for adjustably supporting said covering means over the chute outlet in a plurality of different positions corresponding to different entrained volumes between the covering means and the chute outlet; wherein said means for adjustably supporting comprises an extended support bracket provided on said means for covering and having a first aperture and a second aperture, and an angle adjustment support provided on the chute outlet and having a rotation support aperture which corresponds with said first aperture and a plurality of angle adjustment apertures which correspond with said second aperture as said mulch plate is pivoted about said first aperture with respect to said chute outlet.

36. A mulch plate as recited in claim 35, further comprising an air baffle for preventing debris from escaping between said means for covering and the chute outlet when said means for covering is secured at an angle corresponding to a large entrained volume.

37. A mulch plate as recited in claim 36, wherein said air baffle comprises a long hinge, one side of said hinge being fixedly secured to an underside of said means for covering, the other side of said hinge being slidably engaged with the mower so that when said means for covering is raised said hinge is opened thereby preventing debris and air from escaping between said means for covering and the chute outlet.

38. A mulch plate as recited in claim 37, wherein said hinge is substantially the same length as said means for covering.

39. A mulch plate as recited in claim 37, wherein the other side of said hinge has at least one slot therein, and wherein a pin protrudes from the mower, said pin being slidably engaged in said slot so that the other side of said hinge is slidably engaged with the mower.

40. A mulch plate as recited in claim 36, wherein said air baffle comprises a resilient strip of material fixedly secured to an underside of said means for covering and the mower so that when said means for covering is raised said resilient strip of material is extended thereby preventing debris and air from escaping between said means for covering and the chute outlet.

41. A mulch plate as recited in claim 35, wherein said means for covering comprises an extended lower lip which abuts the mower when said means for covering is in a lowest position corresponding to a smallest entrained volume.

42. A mulch plate as recited in claim 35, further comprising a crossbar secured to the chute outlet for supporting said means for covering over the chute outlet.

43. A mulch plate as recited in claim 42, wherein said crossbar has a cut out portion.

44. A mulch plate as recited in claim 42, wherein said crossbar is provided with a cut out portion for accommodating a protruding end of said extended bracket when said mulch plate is rotated over the top of the mower, as when the mower is being transported, moved through tight spaces and stored.

45. A mulch plate as recited in claim 35, wherein said support bracket means is pivotally connected to said means for engaging through said first aperture.

46. A mulch plate for use with a rotary lawn mower having a deck and at least one rotary blade for cutting and a discharge chute for the expulsion of mower clippings, said mulch plate comprising:

means for covering said discharge chute including a plate having an upper edge, a lower edge, a front end and a rear end, for partially enclosing said discharge chute;

a flange which projects inwardly from said upper edge of said plate toward said mower;

a lip which projects inwardly from said lower edge of said plate toward said mower;

a rear end wall which depends downwardly from said flange along adjacent rear end of said plate;

a front end wall which depends downwardly from said flange adjacent said front end of said plate;

means for pivotally mounting said mulch plate to said mower transversely of said discharge chute such that said mulch plate forms a partial enclosure adjacent said discharge chute; and means for adjustably supporting said mulch plate over said discharge chute in a plurality of different positions in accordance with a particular level of desired mulching.

47. A mulch plate according to claim 46, further comprising means for releasing large debris including a resilient member attached to said rear end wall.

48. A mulch plate as recited in claim 46, wherein said means for adjustably supporting said mulch plate comprises an extended support bracket provided on said mulch plate and having a first aperture and a second aperture, and an angle adjustment support provided on the mower deck and having a rotation support aperture in registry with said first aperture and a plurality of angle adjustment apertures, any one of which may be placed into registry with said second aperture as said mulch plate is pivoted about said first aperture with respect to the discharge chute.

49. A mulch plate as recited in claim 48, further comprising means for connecting said support bracket to said angle adjustment support to permit relative rotation between said mulch plate and the discharge chute and a pin removably insertable through said second aperture and one of said plurality of angle adjustment apertures to secure said mulch plate at a predetermined angle with respect to the discharge chute, each position of said mulch plate corresponding to a different entrained volume between said mulch plate and the discharge chute.

50. A mulch plate is recited in claim 49, wherein said means for connecting comprises means for fixedly securing said covering means over the chute outlet.

51. A mulch plate as recited in claim 50, wherein said means for connecting comprises means for adjustably supporting said covering means over the chute outlet in a plurality of different positions corresponding to different entrained volumes between the covering means and the chute outlet.

52. A mulch plate as recited in claim 46, wherein said means for adjustably supporting comprises an extended support bracket provided on said means for covering and having a first aperture and a second aperture, and an angle adjustment support provided on the chute outlet and having a rotation support aperture which corresponds with said first aperture and a plurality of angle adjustment apertures which correspond with said second aperture as said mulch plate is pivoted about said first aperture with respect to said chute outlet.

53. A mulch plate as recited in claim 52, further comprising an air baffle for preventing debris from escaping between said means for covering and the chute outlet when said means for covering is secured at an angle corresponding to a large entrained volume.

54. A mulch plate as recited in claim 53, wherein said air baffle comprises a long hinge, one side of said hinge being fixedly secured to an underside of said means for covering, the other side of said hinge being slidably engaged with the mower so that when said means for covering is raised said hinge is opened thereby preventing debris and air from escaping between said means for covering and the chute outlet.

55. A mulch plate as recited in claim 54, wherein said hinge is substantially the same length as said means for covering.

56. A mulch plate as recited in claim 54, wherein the other side of said hinge has at least one slot therein, and wherein a pin protrudes from the mower, said pin being slidably engaged in said slot so that the other side of said hinge is slidably engaged with the mower.

57. A mulch plate as recited in claim 53, wherein said air baffle comprises a resilient strip of material fixedly secured to an underside of said means for covering and the mower so that when said means for covering is raised said resilient strip of material is extended thereby preventing debris and air from escaping between said means for covering and the chute outlet.

58. A mulch plate as recited in claim 46, wherein said means for covering further comprises an extended lower lip which abuts the mower when said means for covering is in a lowest position corresponding to a smallest entrained volume.

59. A mulch plate as recited in claim 46, further comprising a crossbar secured to the chute outlet for supporting said means for covering over the chute outlet.

60. A mulch plate as recited in claim 59, wherein said crossbar has a cut out portion.

61. A mulch plate as recited in claim 60, wherein said crossbar cut out portion accommodates a protruding end of said extended bracket when said mulch plate is rotated over the top of the mover, as when the mower is being transported, moved through tight spaces and stored.

* * * * *